United States Patent [19]

Häring

[11] Patent Number: 4,794,710

[45] Date of Patent: * Jan. 3, 1989

[54] SNOWPLOW BLADE WITH SPRING-LOADED EDGE FLAPS

[76] Inventor: Theodor Häring, Industriestrasse 4, 7891 Dettighofen, Fed. Rep. of Germany

[*] Notice: The portion of the term of this patent subsequent to Jan. 13, 2004 has been disclaimed.

[21] Appl. No.: 2,127

[22] Filed: Jan. 12, 1987

Related U.S. Application Data

[63] Continuation-in-part of Ser. No. 621,514, Jun. 18, 1984, Pat. No. 4,635,387.

[51] Int. Cl.$^4$ .............................................. E01H 5/04
[52] U.S. Cl. ...................................................... 37/232
[58] Field of Search .............. 37/232, 233; 172/701.1, 172/705, 816

[56] References Cited

U.S. PATENT DOCUMENTS

| | | | |
|---|---|---|---|
| 2,055,291 | 9/1936 | Henry | 37/233 |
| 3,199,234 | 8/1965 | Reissinger | 37/233 |
| 3,429,059 | 2/1969 | Reissinger | 37/233 |
| 3,772,803 | 11/1973 | Cole | 37/233 |
| 3,808,714 | 5/1974 | Reissinger et al. | 37/233 |
| 4,074,896 | 2/1978 | Eftefield | 172/816 X |
| 4,635,387 | 1/1987 | Häring | 37/232 |

Primary Examiner—Clifford D. Crowder

[57] ABSTRACT

A snowplow with a blade having a lower edge to which several spring flaps are hingeably linked. Reset springs retain the spring flaps in their working positions, and return the spring flaps to their working positions after having been deflected. To prevent overload of the reset springs, each is supported to be movable in the same sense as the pivoting direction of the associated spring flap, so that the increase in spring force, while the spring flap is being deflected, is at least partially counteracted.

5 Claims, 3 Drawing Sheets

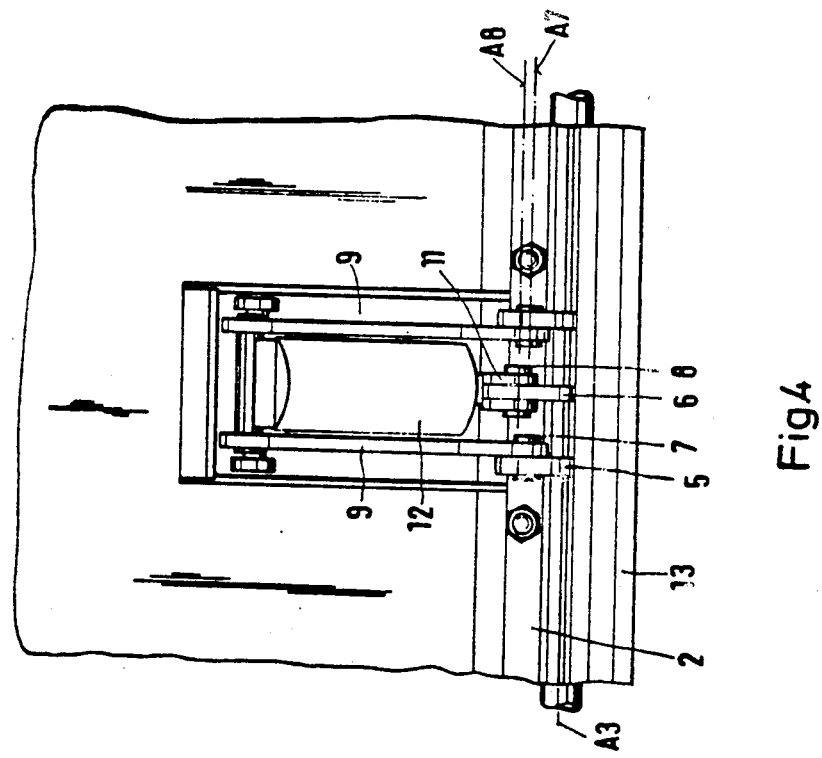
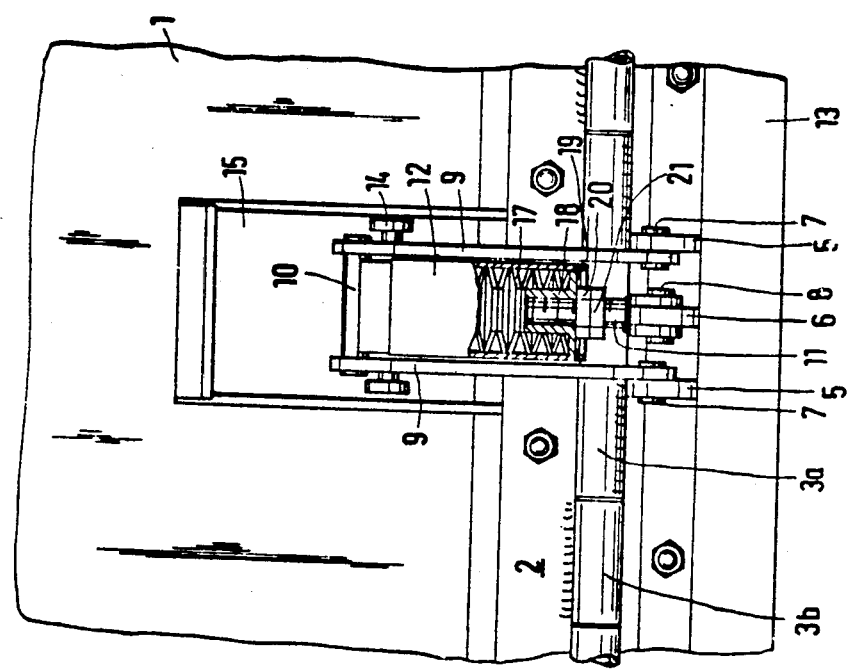

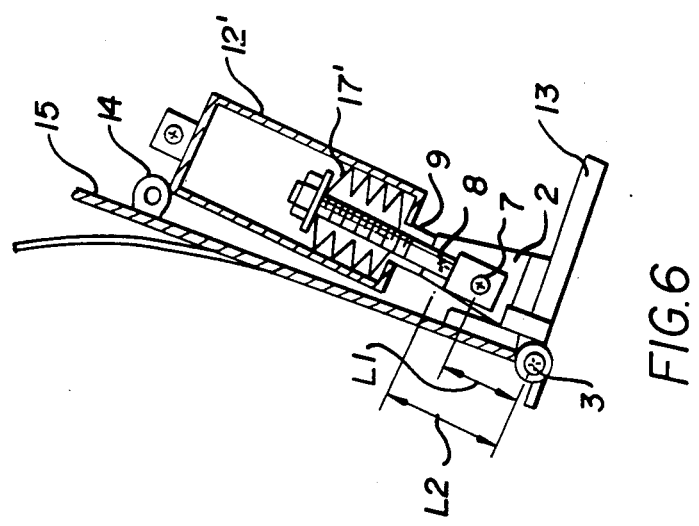
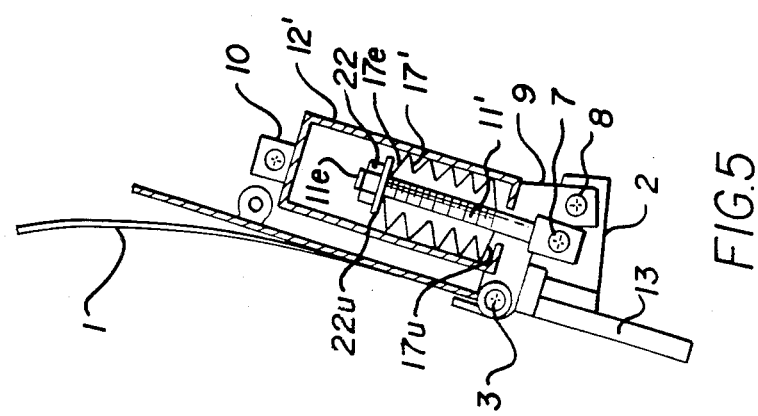

SNOWPLOW BLADE WITH SPRING-LOADED EDGE FLAPS

This is a continuation-in-part of Ser. No. 621,514 filed June 18, 1984, now U.S. Pat. No. 4,635,387.

BACKGROUND OF THE INVENTION

The invention relates to a snowplow blade having spring flaps hinged to a bottom edge of the blade. The flaps are retained in their working positions by pre-tensioned reset springs, and wear bars are fastened to the flaps.

With known spring-flap snowplows, the spring flaps are coupled closely together at the plowblade. A torsion reset spring, supported against the backside of the plowblade, holds each spring flap in its working position. When the spring flaps encounter obstacles in the road surface, the individual spring flaps can deflect against the torsion spring by a clockwise swinging motion. This increasingly tensions the reset spring. Considering that the reset spring is already under considerable pre-tension in the normal working position of the spring flap, it is apparent that the reset springs often rupture after a short operating interval as a result of the shock-like deflecting motions of the spring flaps. Even if the springs do not rupture, there is a reduction in their pre-tensioning.

Attempts have been made to compensate this disadvantage by proper dimensioning of the reset springs. In so doing, a compromise has been necessary. The reset spring has to be strong enough to retain its associated spring flap in its working position with sufficient pre-tension. On the other hand, excessive deformation of the spring must be avoided when the spring flap is in its retracted state. With the torsion springs that are customarily used, this compromise could be achieved only by specially fabricated springs with dimensions closely matched to the spring material. Even so, the springs are frequently destroyed prematurely. Moreover, the force of the reset springs, especially with heavy wet snow, often is not sufficient to return the retracted spring flaps to their working positions.

Additionally, known spring-flap snowplows have the further disadvantage, due to the arrangement of the pivoting axis just behind the plowblade, that there is a considerable undercut of the path of motion of the scraping edges of the spring flaps below the surface being scraped.

By contrast, the present invention aims to improve the action of the reset springs in connection with spring-flap snowplows, especially to avoid an overloading of the reset springs, and further to reduce the undercut of the spring flaps to a neglibible value.

SUMMARY OF THE INVENTION

According to the invention, the foregoing objects are achieved for a snowplow as follows: The reset spring is supported to move in the same sense as the pivoting direction of the spring flap, in a fashion such that the increase of spring force during deflection of the spring flap is at least partially counteracted.

The invention further provides a deflection motion on the part of the reset spring. As a result, the increasing compression, due to the turn-around of the spring flap, can be limited so that overloads are avoided, both during continuous operation and even taking into account considerable shock loading on the spring flap. Consequently, the life of the reset springs can be considerably increased. By providing a suitable displacement path for the reset spring, the individual dimensioning of each reset spring is no longer critical. Commercially available springs, therefore, can be used as reset springs, with compression springs being particularly suitable. These springs are supported against a stop that yields during compression.

A particularly suitable embodiment of the invention provides a reset spring that is formed by a large number of saucer segments contained in a housing. Further, the housing is made adjustable so as to counteract the compression of the saucer segments. By such a constraint on the spring housing, the reset force of the saucer springs can be adjusted in a prescribed fashion over the entire pivoting path of the spring flap. In addition, to better achieve this objective, the pre-tension of the saucer springs can be made variable.

An especially advantageous embodiment of the invention includes a housing, which is mounted on coupling supports and is pivotable about a first axis at the backside of the spring flaps; and a tappet that is likewise supported so as to be pivotable about a second axis at the backside of the the spring flap where the tappet acts on the saucer springs. In this arrangement, the first axis is closer to the plow axis than the second axis.

As a result, a large displacement on the part of the spring flap can be converted into a relatively short path for the reset spring. Due to the spatial arrangement of the two axes, there is obtained a constant pressure of the housing against the backside of the plowblade. Consequently, additional fasteners are not needed. Instead, it is sufficient for the housing or the supports to be guided between lateral rails and for the housing to be supported slidingly or by rollers at the backside of the plowblade.

In addition, the housing can be connected with the backside of the plowblade by a steering connection. Such a variant is especially desirable if the particular geometry described above for the two axes can not be realized. The latter feature further makes it possible to displace the hinge axis, for the connection of the spring flap with the plowblade, approximately into the plane of the plowblade. Accordingly, the undercut of the spring flaps can be reduced to a small value corresponding to the slant of the plowblade. This facilitates the resetting of the spring flaps from their deflected position into their working position, which is in the clockwise sense.

DESCRIPTION OF THE DRAWINGS

An illustrative embodiment of the invention is explained below in more detail in terms of the drawings, in which:

FIG. 3 is a view of the backside section of a snowplow with its spring flap in its working position; and FIG. 4 is a view similar to that of FIG. 3, with the spring flap completely retracted.

FIG. 5 is a view similar to that of FIG. 1 showing, in partial section, an alternative embodiment of the invention in which a tappet extends completely through a reset spring; and FIG. 6 is a modification of the view of FIG. 5 showing wear bar of the snow plow blade in its retracted position after encountering an obstacle, with the housing for the reset spring moved upwardly and the reset spring compressed to allow restoration of the snow plow blade to its working position once the obstacle has been cleared.

DETAILED DESCRIPTION

Figure 1:
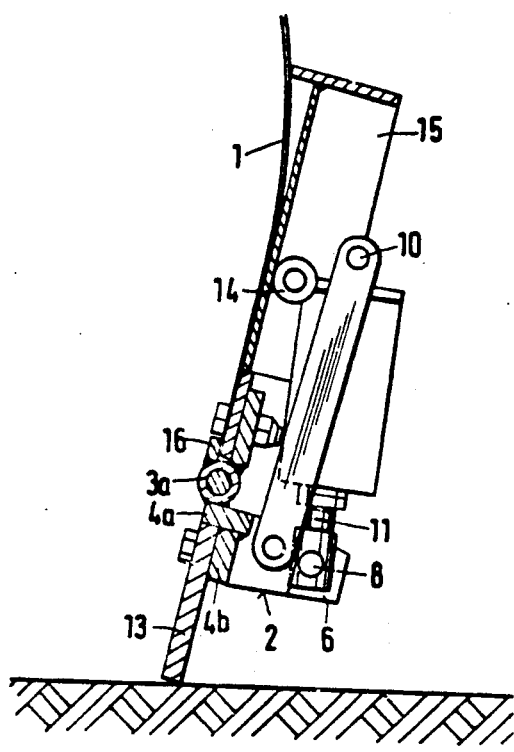
FIG. 1 is a vertical section through a snowplow blade in the region of its spring flap, which is shown in its working position.

With reference to FIGS. 1 through 4, a spring-flap snowplow includes a plowblade (1) connected to a bulldozer-type vehicle by a coupling device, and spring flaps (2) that are joined to the blade by a hinge (3). The flaps are pivotably fastened and have wearbars (13).

In the usual snowplow, two to four spring flaps preferably are disposed at the lower edge of the plowblade. The hinge (3) has a structure corresponding to the well-known piano hinge. As a result, the tube jointing sleeves (3a, 3b) (FIG. 3) are seated on the hinge axis and are welded alternately to the plowblade (1) and the spring flaps (2). Forward motion of the spring flaps (2) is limited by a stop bar (16).

Figure 2:
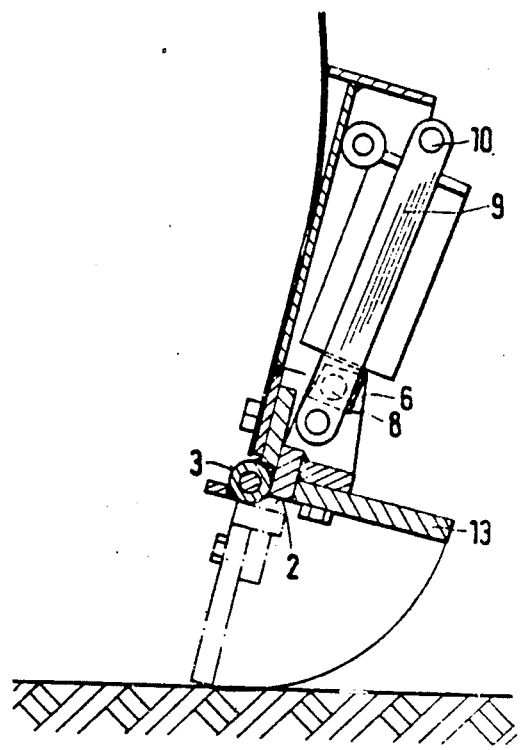
FIG. 2 is a view similar to that of FIG. 1, with the spring flap completely retracted.

As shown in FIGS. 1 and 2, one of the tube jointing sleeves (3a) is welded to two flatirons (4a, 4b) and the stop bar (16). The two flatirons (4a, 4b) form a seat for the wearbar (13), which is screwed to the flatiron (4b), so that the wearbar can be replaced easily. Plates (5, 6) are welded to the flatirons (4a, 4b), perpendicular to the longitudinal direction of the flatirons (FIG. 3). These plates act as long supporting blocks (5, 6) in which are seated bearings pins (7, 8). The axes of the pins (7, 8) run parallel to the axis of hinge (3).

Bolts (7), which are mounted in the shorter supporting blocks (5) penetrate the lateral supports (9) which form a yoke together with an upper transverse part (10).

A tappet (11) is seated on each of the pins (8), which are mounted in the longer supporting blocks (6). The tappet (11) acts on a reset spring in a housing (12). In a preferred design, the reset spring is realized by several saucer elements (17), which are included within the spring housing (12).

The tappet (11) bears against the saucer springs (17) by way of a pressure plate (18) (FIG. 3) that is guided within the interior of the housing (12). The tappet (11) thus presses the saucer elements (17) together. The required pre-tension of the reset spring can be established by a safety ring (19), which is situated in a ring groove cut into the interior of the housing.

The amount of pre-tension also can be varied by changing the length of the tappet (11). For this purpose, the tappet (11) has an outer thread on which a pressure plate (18) is placed. The tappet (11) is secured by a nut (20) with a counter nut (21).

The spring housing (12) is fastened at the transverse part (10) of the yoke. The guidance of the spring housing (12) can be achieved in a variety of ways. Illustratively, rollers (14) are fastened to the housing below the lateral supports (9) of the yoke. These rollers (14) run in a U-shaped reinforcement rail (15).

As shown in FIG. 3 the tube jointing sleeve (3b) of the hinge (3) is connected with the plowblade (1); and the tube jointing sleeves (3a) are connected with the spring flap (13).

To explain the mode of operation, the essential axes for functioning are identified in FIG. 4. A3 identifies the axis of the hinge (3); A7 is the axis of the pins (7); and A8 is the rotational axis of the pin (8).

As can be seen from the drawings (FIG. 4), the axis (A7) of the coupling of the supports (9) of the yoke is closer to the hinge axis (A3) than is the axis (A8) for the coupling of the tappet (11). When traversing an obstacle, the spring flap (2) is swung rearwardly and upwardly. At the same time, the yoke is forcibly moved upwardly a corresponding amount, as is the tappet. However, since the coupling axis (A8) is farther removed from the rotational axis (A3) of the hinge (3) than is the pin axis (A7), the tappet (11) is pushed into the spring housing (12). This compresses the reset spring.

The total motion of the tappet (11) consequently corresponds to the translational motion of the yoke plus the spring path.

In this fashion, a relatively large motion can be achieved within the existing space, by using a reset spring with a high spring force and a short spring path.

With reference to the alternative embodiment of the invention shown in FIG. 5, the plow blade (1) includes spring flaps (2) that are joined to the blade by a hinge (3). The flaps are pivotally fastened and have wear bars (13) as for the embodiment of FIGS. 1-4.

In addition, the spring flap (2) is connected by a lateral support (9) to an upper transverse part (10) in the fashion of FIG. 1, except that since FIG. 5 shows a modified reset spring housing (12') in section, so that only the remote lateral support (9) is visible in FIG. 5.

The significant modification in FIG. 5 relates to the connection of a modified tappet (11') to a modified reset spring (17'). By contrast with FIG. 1, the tappet (11') extends completely through the reset spring (17') and is centered along its cylindrical axis. In addition, the upper end (11e) of the tappet (11') is provided with a stop (22) with an under surface (22u) that abutts the upper end (17e) of the reset spring (17'). The lower end (17u) of the reset spring (17') abutts the bottom of the housing (12'). The housing (12') is mounted to be moveable an the same sense as the pivoting direction of the spring flap (2). Accordingly, when the spring flap pivots upwardly in a counterclockwise direction about the hinge (3), the spring housing also moves upwardly.

The consequence of the upward movement of the spring flap (2) and the housing (12') is illustrated in FIG. 6, which depicts the situation when the wear bar (13) strikes an obstacle. Because the housing (12') moves upwardly to a greater extent than the tappet (11'), the reset spring (17') is compressed. The difference in the extent of movement of the spring housing (12') and the reset spring (17') is a consequence of the difference in the pivoting of the support (9) and that of the tappet (11'). The lever arm of the pivot position (8) for the support (9), with respect to the hinge (3), is greater than the lever arm to the pivot position (7) for the tappet (11'). Consequently, when the spring housing is moved upwardly by the support (9) as shown in FIG. 6, the housing freely moves upwardly along the flange of the reinforcement rail (15) by virtue of the rotation of the roller (14) that is fastened to the housing (12'). Simultaneously, the tappet (11') also moves upwardly, but to a lesser extent than the upward movement of the housing (12') because of differences in lever arm discussed above. For comparison, the lever arm for the tappet (11') is illustrated in FIG. 6 by the length L1, while the corresponding lever arm for the support (9) is illustrated by the length L2.

It will be appreciated that various modifications can be made in the illustrated embodiments, that are within the skill of the art.

What is claimed is:

1. A snowplow comprising a blade having a face and a bottom, a spring flap at the bottom of said blade having a pivot with an axis disposed in approximately the face of the said blade, a wear bar depending from said spring flap and retained in a working position by a pretensioned compressible reset spring included within a housing, said housing being desplaceable with respect to said blade, and means interconnecting said spring flap and said reset spring responsive to the pivoting of said spring flap to simultaneously compress said reset spring and displace said spring housing;

characterized in that a tappet (11') for said reset spring (17') has a pivot position (7) which has a shorter length with respect to said hinge (3) that the length to the pivot position (8) of a support (9) for said spring housing (12').

2. A snow plow with a blade according to claim 1 characterized in that a tappet (11') extends completely through said reset spring (17') along its cylindrical axis, with the upper end of said tappet (11') provided with a stop (22) having an under surface (22u) which abuts the top end (17e) of said reset spring (17') and the lower end (17u) of said reset spring (17'') abuts the bottom of said spring housing (12') which is moveable in the same sense as the pivoting direction of said spring flap (2).

3. A snow plow blade according to claim 1 characterized in that the tappet (11') extends from said spring flap and is adjustable.

4. A snow plow blade according to claim 1 characterized in that the reset spring is formed by a plurality of elements included within said spring housing (12').

5. A snow plow blade according to claim 1 characterized in that the spring housing (12') has at least 1 support (9) pivotally connected thereto.

* * * * *